WIDE BAND-PASS CRYSTAL FILTER EMPLOYING SEMICONDUCTORS
Filed June 21, 1961
2 Sheets-Sheet 1
Fig. I
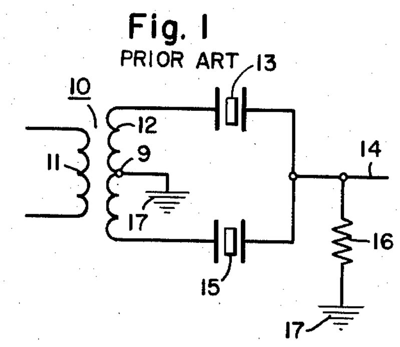
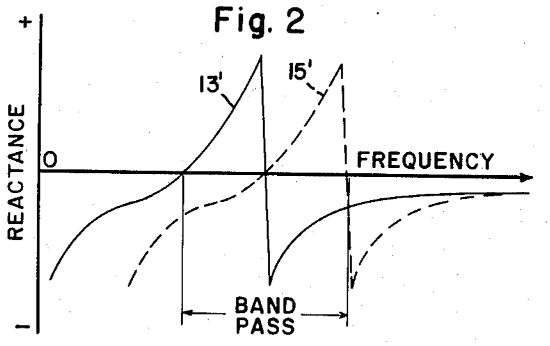
PRIOR ART
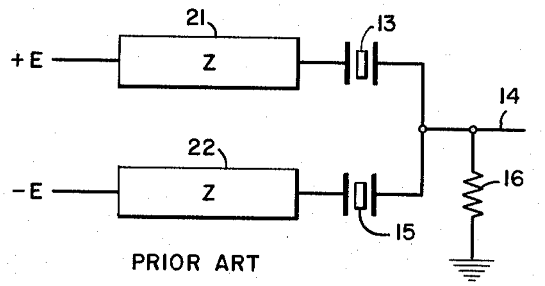
Fig. 3
Fig. 5
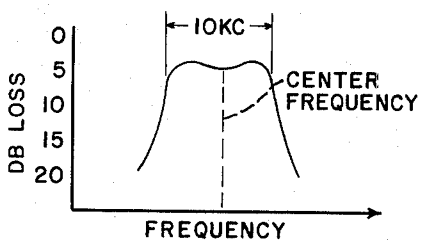
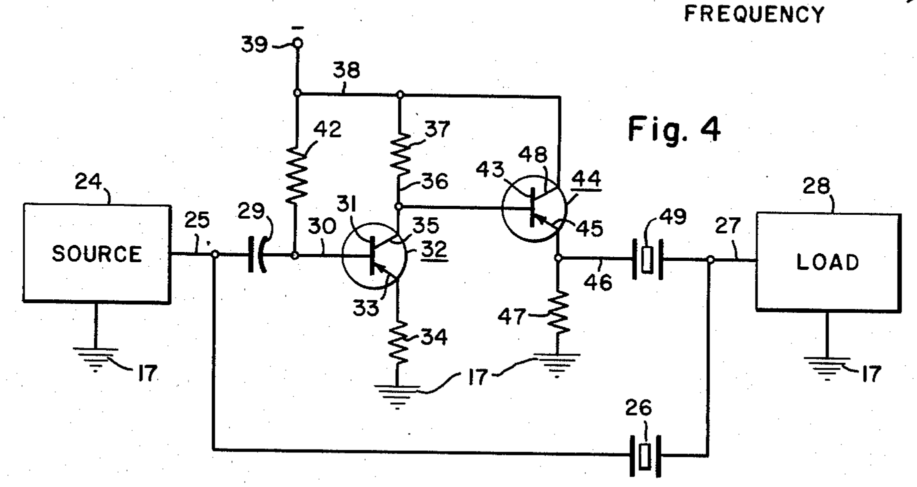
WITNESSES
John E. Healey, Jr.
James F. Young
INVENTORS
Edgar L. Fogle, Roland G. Lascola
& Harold M. Wasson
BY Maury I. Hull
ATTORNEY United States Patent Office 3,206,692
Patented Sept. 14, 1965

3,206,692
WIDE BAND-PASS CRYSTAL FILTER EMPLOYING SEMICONDUCTORS

Edgar L. Fogle, Shirleysburg, Pa., and Roland G. Lascola, Baltimore, and Harold M. Wasson, Severna Park, Md., assignors to Westinghouse Electric Corporation, East Pittsburgh, Pa., a corporation of Pennsylvania
Filed June 21, 1961, Ser. No. 118,602
4 Claims. (Cl. 330—21)

This invention relates to improvements in crystal filters, and more particularly to an improved crystal filter providing a wide band-pass and employing no inductive elements, so that the filter, with the exception of the crystals, may be constructed in monolithic form.

Present and prior art filters having low loss, wide bandwidth, and a sharp frequency characteristic may use crystals in a lattice network, using inductors which in the present state of the art cannot be conveniently built using monolithic construction.

This invention utilizes a transistor circuit with two crystals, providing the characteristics of a crystal filter connected in a lattice network but eliminating the necessity for inductors.

In summary, the apparatus of the instant invention provides two crystal paths between an input lead and an output lead, one of the paths being directly through a crystal and the other being through a first transistor in which a phase shift of 180° occurs, followed by an emitter-follower impedance transforming transistor, in which no additional phase shift occurs, so that the signals at the two crystals differ in phase by 180°. The values of load resistors for the transistors are chosen so that the amplitudes of the signals at the two crystals are equal; the attainment of this condition is also facilitated by having the value of the driving resistors chosen so that the driving impedances of the two crystals are substantially equal. The crystals have slightly different series resonant frequencies in accordance with the desired bandwidth, and the parallel resonant frequency of one crystal is substantially equal to the series resonant frequency of the other crystal.

Accordingly, a primary object of the invention is to provide a new and improved crystal filter.

Another object is to provide a new and improved wide band-pass crystal filter.

A further object is to provide a new and improved wide band-pass crystal filter in which no inductors are employed and which is suitable for monolithic construction.

These and other objects will become more clearly apparent after a study of the following specification, when read in connection with the accompanying drawings, in which:

FIGURE 1 is a view of a typical prior art band-pass crystal filter;

FIG. 2 is a graph illustrating the characteristics of the prior art circuit of FIG. 1;

FIG. 3 is an equivalent circuit of the apparatus of FIG. 1;

FIG. 4 is a schematic electrical circuit diagram of the invention according to the preferred embodiment thereof;

Figure 4A:
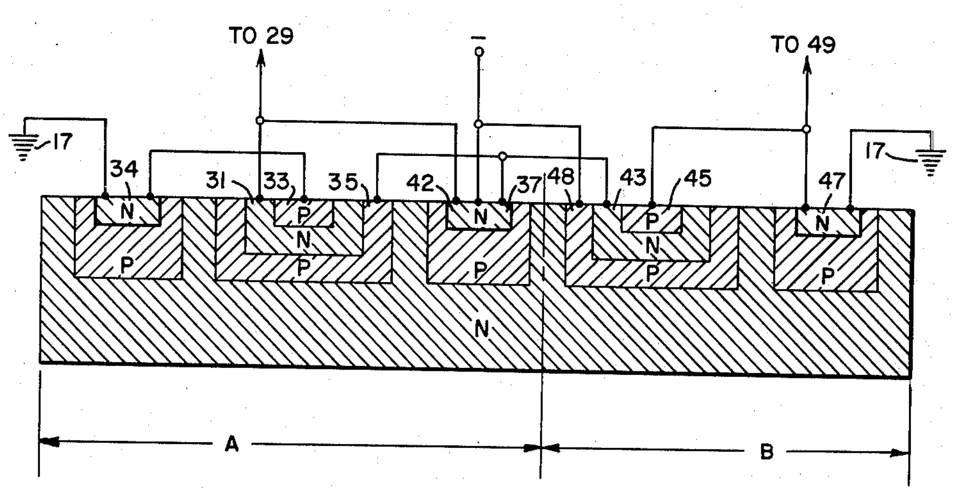
FIG. 4A is a sectional view illustrating one form of monolithic semiconductor construction in which the transistor means portion of the circuit of FIG. 4 is incorporated; and, FIG. 5 is a graph showing exemplificative band-pass characteristics of the apparatus of FIG. 4.

Referring now to the drawings, in which like reference numerals are used throughout to designate like parts, for a more detailed understanding of the invention, and in particular to FIG. 1, there is shown a crystal filter according to the prior art. The filter includes a transformer generally designated 10 having a primary 11 and a center-tapped secondary 12. One end of the secondary 12 is connected by way of a first crystal 13 to an output lead 14, whereas the other end of the secondary is connected by way of crystal 15 to the output lead 14.

Crystal 13 has a certain series resonant frequency, offering a low impedance to the passage of signals of this frequency, and has a different parallel resonant frequency close to and higher than the series resonant frequency; to signals of the parallel resonant frequency, crystal 13 offers a high impedance. For a further discussion of this feature, reference may be had to a work entitled, "Electronic and Radio Eengineering," by Terman, McGraw-Hill Book Co., 4th ed., 1955, pp. 508–510. Crystal 15 also has different series resonant and parallel resonant frequencies, and the parallel resonant frequency of one crystal is chosen to be substantially equal to the series resonant frequency of the other crystal. The output lead 14 is shown as having load resistor 16 connected therefrom to ground 17, the resistor 16 not being part of the filter, and the center tap 9 of the secondary 12 is connected to ground. Tuning means, for example, a capacitor connected across the full secondary 12 is sometimes provided where needed. Such band-pass crystal filters are well known in the art; a similar band-pass crystal filter circuit is shown in "The Radio Amateurs Handbook," published by the American Radio Relay League, Hartford, Connecticut, 36th ed., 1959, page 109. In FIG. 2, to which particular reference is made, the reactances of the two crystals are plotted as a function of frequency, the curve 13' representing the reactance-versus-frequency characteristics of crystal 13, and the curve 15' representing the reactance-versus-frequency characteristic of crystal 15. It will be seen that in accordance with the previous statement that one crystal is series resonant at the parallel resonant frequency of the other, in FIG. 2 the reactance of the two crystals is zero at some frequency $(Fr_1=Fa_2)$, where $Fr_1$ is the resonance of one crystal and $Fa_2$ is the anti-resonance of the other crystal. It will be further seen that a band-pass effect is provided for a particular portion of the frequency range of the coordinate lying within certain limits extending approximately from the lower series resonant frequency to the higher parallel resonant frequency, and that signals of frequencies on either side of the band-pass region undergo great attenuation.

In FIG. 3, the transformer portion of the circuit has been replaced by equal generalized impedances 21 and 22 to which voltages of opposite polarity E and —E are applied.

Particular reference is made now to FIG. 4. There is shown in broad form at 24 a source of a radio frequency signal, which develops a signal on lead 25 with respect to ground 17. Source 24 may be of variable frequency if desired. Lead 25 is connected by way of crystal 26, supported in a conventional holder to an output lead 27 which delivers a signal with respect to ground to a load or utilization device shown in block form at 28. The source 24 may have an impedance of 50 ohms to ground, if desired. The signal on lead 25 is supplied by way of capacitor 29 and lead 30 to the base 31 of a transistor generally designated 32 having an emitter 33 connected by way of resistor 34 to ground 17, and a collector 35 connected by way of lead 36, resistor 37, and lead 38 to terminal 39 which is connected to a source of direct current energizing potential, not shown, of suitable amplitude and polarity, having the other terminal thereof connected to ground 17. For convenience in illustration, the transistor 32 is shown to be a PNP transistor, and accordingly, in order that the collector and emitter of the transistor may be properly biased with respect to the base, the terminal 39 should be of negative polarity with respect to ground. From the aforementioned lead 38, a resistor 42 is connected to the aforementioned lead 30 for biasing the base 31 with respect to the collector 35 and emitter 33. The aforementioned lead 36 and collector 35 are connected to the base 43 of an additional PNP transistor generally designated 44, having an emitter 45 connected by way of lead 46 and resistor 47 to ground 17, and having the collector 48 thereof connected to the aforementioned lead 38. The aforementioned lead 46 is connected by way of an additional crystal 49 also in a conventional holder to the aforementioned output lead 27. The series resonant frequency of one of the crystals is equal to the parallel resonant frequency of the other.

Preferably, the transistors 32 and 44 are high frequency transistors, and may be of a type known in the trade as a 2N700. As previously stated, it is desirable that the signals at the two crystals 49 and 26 differ in phase by 180°. It will be noted that the transistor 44 is connected as an emitter-follower transistor, and the phase shift in this particular transistor approaches zero, while the phase shift in the transistor 32 may be made to be approximately 180°, notwithstanding the fact, as will be noted, that the transistor 32 circuit departs somewhat from the conventional grounded-emitter transistor configuration in which a phase shift of 180°, neglecting high frequency effects, could be expected to occur. It will be understood, though, that by suitable choice of transistors having known internal capacitances between elements and suitable choice of component values, the signals at the crystals 49 and 26 may differ by precisely 180°. Furthermore, the ratio of resistor 37 to resistor 34, which ratio determines the gain of the transistor stage 32, is chosen or adjusted so that the amplitude of the signals at the two crystals 26 and 49 are equal; furthermore, the value of resistor 37 is chosen so that the driving impedances to the two crystals 26 and 49 are substantially equal, as a means of further insuring that the amplitudes of the signals at the two crystals are equal. This driving impedance can be mainly resistive in nature because, as previously stated, high frequency transistors are employed.

It has been found that where the source 24 has an impedance of approximately 50 ohms as aforestated and develops a signal of from 9 to 10 megacycles in frequency, the crystals 49 and 26 have frequencies of a similar resonant nature of 9.453 and 9.457 megacycles, respectively, and the output load has an impedance of approximately 50 ohms, that the filter exhibits a 3 decibel bandwidth of about 10 kilocycles, and a loss of only 3 decibels across the bandpass, with a ripple component, if any, of less than 2 decibels.

FIG. 4A illustrates one form of monolithic semiconductor construction in which are incorporated the essential components in the circuit diagram of FIG. 4 for accomplishing phase inversion, isolation, and impedance and amplitude matching. The reference characters of the circuit of FIG. 4 are applied to the corresponding components of FIG. 4A.

The portion of the figure designated A constitutes the phase inverting region while the portion of the figure designated B constitutes the emitter follower region. Although not so indicated, the capacitor 29 could be built into the same monolithic block as is well known in the art.

Particular reference is made now to FIG. 5, where the band-pass characteristic of apparatus similar to that of FIG. 4 is shown, attenuation as a function of frequency being plotted. The center frequency may be, for example, approximately 30 megacycles.

It will be seen that the circuit of FIG. 4 needs no inductors to obtain the band-pass characteristics of the filter, and accordingly, the circuit is suitable for partial monolithic construction with the transistors, resistors, leads and capacitors being suitably doped regions of a single block of semiconductor material in accordance with well known molecular engineering techniques.

Where such terms as "lead means," "resistor," "capacitor," "transistor," etc. are used in the claims appended hereto, it will be understood that these may be regions of a single block of semiconductor material having therein impurities of the desired types and concentrations, rather than discrete circuit elements.

If desired, greater bandpass than 10 kilocycles can be obtained by using quartz crystals with lower inherent shunt capacitance. The lower shunt capacitance causes the frequency difference between series and parallel resonance of one crystal to be greater, allowing wider frequency separation between the two crystals used and producing a wider bandpass.

Whereas the invention has been shown and described with respect to PNP transistors, it will be understood that NPN transistors or suitably doped regions of a semiconductor block, to provide the effect of an NPN transistor, may be employed, if desired.

It will be understood that the two crystals may be originally selected on the basis that one crystal has a parallel resonant frequency which is equal to the series resonant frequency of the other.

It will be further understood that whereas this last-named condition regarding the equality of the series resonant frequency of one crystal with the parallel resonant frequency of the other is highly desirable, some difference may be tolerated where substantially flat filter response in the band-pass region is not essential, and other deterioration of optimum band-pass characteristics is permissible.

The condition that the signals at the two crystals be precisely 180 degrees out of phase with each other is highly desirable, to insure effective cancellation of capacities in the crystals and holders, and for other reasons.

The condition that the signals at the two crystals be of equal amplitude is highly desirable; when this condition is departed from, cancellation may not be obtained, and the steep slopes of the response curve on either side of the band-pass region may not be obtained.

The condition that the source input impedances as seen by the two crystals be equal is desirable, but may not be critical.

Whereas the invention has been shown and described with respect to a specific embodiment thereof which gives satisfactory results, it should be understood that changes may be made and equivalents substituted without departing from the spirit and scope of the invention.

We claim as our invention:

1. A band-pass crystal filter comprising, in combination, input lead means, said input lead means having a signal of variable frequency applied thereto, output lead means, a pair of similar crystals, the series resonant frequency of one crystal of said pair being substantially equal to the parallel resonant frequency of the other crystal of said pair, one crystal of said pair being connected directly between said input and output lead means, phase inverter transistor means and circuit means including said transistor means and the other crystal of said pair in series between the input lead means and the output lead means.

2. A band-pass crystal filter comprising, input signal lead means, output lead means, a pair of similar crystals, holder means for each crystal, the series resonant frequency of one crystal of said pair being substantially equal to the parallel resonant frequency of the other crystal of said pair, means connecting the holder means of one crystal of said pair between the input lead means and an output lead means, and circuit means including first and second transistor means for connecting the other crystal of said pair between said input and output lead means, said first transistor means being connected in a grounded emitter configuration, said second transistor means being connected in an emitter-follower configuration, having its base connected to the collector of said first transistor means, and having its emitter connected to the holder means for said other crystal of said pair.

3. A band-pass crystal filter comprising, a semiconductor block having input and output terminals, one of said terminals being common to said input and output, means for applying a band of signal frequencies to said input terminals, an output lead adapted to be connected to a load circuit, at least two filter crystals, the series resonant frequency of one of said crystals being substantially equal to the parallel resonant frequency of the other of said crystals, means operatively connecting one of said crystals between the non-common input terminal and said output lead, a first phase-inverting transistor region in said semiconductor block having its input connected to said non-common input terminal, a second emitter-follower transistor region in said semiconductor block, a circuit region in said semiconductor block connecting the output of said first transistor as an input to said second transistor region, and means connecting the other crystal between the emitter of said second transistor region, constituting the non-common output terminal of said semiconductor block, and said output lead.

4. A band-pass crystal filter comprising input terminals and output terminals, one of said terminals being common to said input and said output, said input terminals adapted to have impressed thereon a band of signal frequencies and said output terminal adapted to be connected to a load device, at least two branch circuits between said non-common input and output terminals, a filter crystal for each branch circuit, the series resonant frequency of one of said crystals being substantially equal to the parallel resonant frequency of the other crystal, means operatively connecting one crystal directly between said non-common input terminal and said non-common output terminal, a phase-inverting, isolation and amplitude determining monolithic semiconductor unit having its input connected to said non-common input terminal and having its output connected to the other crystal, said monolithic unit including a first phase-inverting transistor region and an emitter-follower transistor region, a circuit region in said semiconductor block connecting the output of said phase-inverting transistor region as an input to said emitter-follower region, means connecting the other crystal between the emitter of said emitter-follower region and said non-common output terminal, said phase-inverting transistor having a first resistor in the collector circuit thereof and a second resistor in the emitter circuit thereof for determining the gain of said phase-inverting stage.

References Cited by the Examiner

UNITED STATES PATENTS

| | | | |
|---|---|---|---|
| 1,967,249 | 7/34 | Mason | 330—174 |
| 2,653,194 | 9/53 | Lyons | 330—126 |
| 2,868,898 | 1/59 | Phanos | 330—174 |

ROY LAKE, *Primary Examiner.*

JOHN KOMINSKI, NATHAN KAUFMAN, *Examiners.*